United States Patent
Michalec

[15] 3,680,307
[45] Aug. 1, 1972

[54] HEAT ENERGY TRANSFER DEVICE

[72] Inventor: Lester W. Michalec, 1110 N.W. 74th Terrace, Hollywood, Fla. 33024

[22] Filed: Feb. 17, 1969

[21] Appl. No.: 799,831

[52] U.S. Cl. ...................................... 60/26, 126/271
[51] Int. Cl. ................................................ F03g 7/04
[58] Field of Search ........ 60/26; 126/270, 271; 353/3

[56] References Cited

UNITED STATES PATENTS

| | | | |
|---|---|---|---|
| 497,079 | 5/1893 | Severy | 126/270 |
| 1,047,554 | 12/1912 | Nichols | 126/271 |
| 2,247,830 | 7/1941 | Abbot | 126/271 |
| 3,348,374 | 10/1967 | Schalkowsky | 60/26 |

*Primary Examiner*—Martin P. Schwadron
*Assistant Examiner*—Allen M. Ostrager
*Attorney*—Eugene F. Malin

[57] ABSTRACT

A heat energy transfer device including tanks, shielding means, and a drive means. The tanks contain fluid that is highly responsive to temperature variations over a practical temperature range in order to provide vapor pressure to move the fluid to operate the drive means. Each tank is connected to the drive means. Shielding means are connected to each tank in order to provide energy source guidance functions by controlling the movement of the piston engines in relation to the energy source.

8 Claims, 4 Drawing Figures

INVENTOR.
LESTER W. MICHALEC

INVENTOR.
LESTER W. MICHALEC

HEAT ENERGY TRANSFER DEVICE

BACKGROUND OF THE INVENTION

This invention relates to a new and improved heat energy transfer device, and more particularly, to a solar energy device for controlling the orientation of a platform with respect to the sun.

As is perhaps well-known, heat energy transfer devices have utilized movable shutters to control the energy input into such devices. In the past, many solar energy power plants have been designed and constructed. Solar power plants convert sun rays into steam to provide mechanical force and motion. The solar power plants convert the suns rays steam energy, and thereafter use the steam to drive steam engines. Also, various sun referenced oriented devices have been designed for navigating through space.

SUMMARY OF THE INVENTION

The present invention relates to a new and improved heat energy device that includes a plurality of tanks, shielding means and drive means. The tanks contain fluid that is highly responsive to temperature variations over a practical temperature range in order to provide vapor pressure to move the fluid to operate the drive means. Each tank is connected to the drive means. The heat energy transfer device converts the source of heat into vapor pressure to drive the fluid against the piston to provide mechanical force and motion. Shielding means are connected to the tanks in order to control the movement of the drive means. The shields may be oriented to provide a heat energy transfer device having guidance functions.

It is an object of this invention to provide a non-complex heat energy transfer device.

It is another object of this invention to provide a plurality of heat energy transfer devices fixed in relation to one another in order to provide a non-complex energy orienting guidance function.

A further object of this invention is to provide fixed shielding means connected to the heat energy transfer tanks in order to control the energy orienting guidance function.

In accordance with these and other objects which will be apparent hereinafter, the instant invention will now be described with particular reference to the accompanying drawings.

DESCRIPTION OF THE PREFERRED EMBODIMENT

Figure 1:
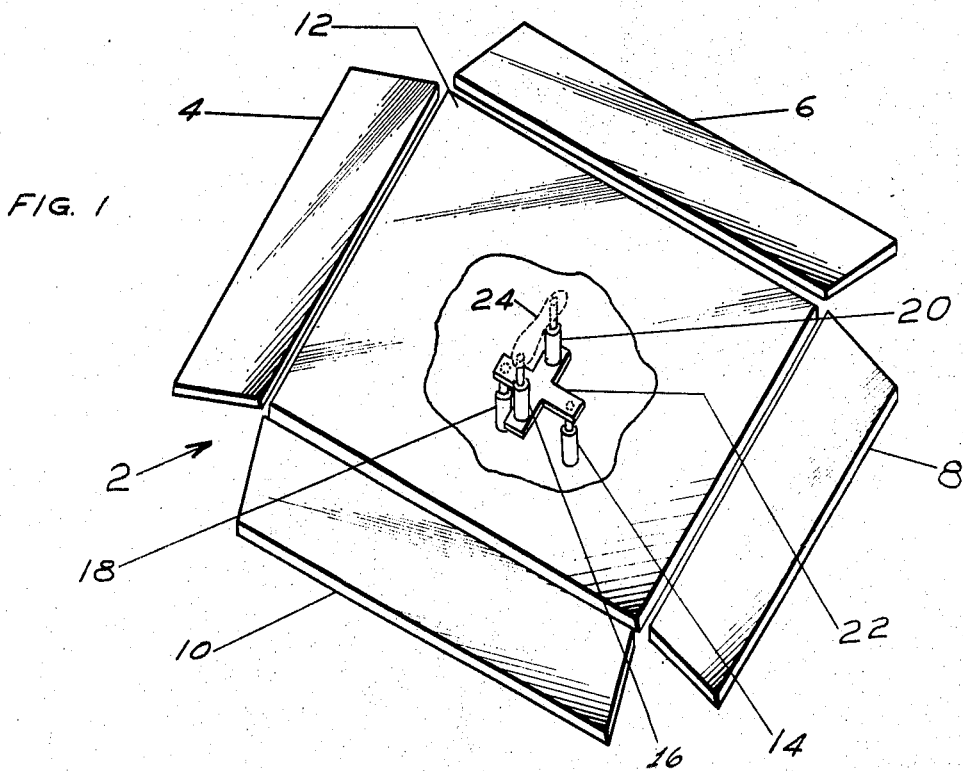
FIG. 1, is a perspective view of one embodiment of the heat energy transfer device having an energy orienting guidance function.

Referring now in detail to the drawings, wherein an embodiment of the invention is shown, and referring, particularly to FIG. 1, the heat energy transfer device, generally designated as numeral 2, includes a plurality of tanks 4, 6, 8, and 10 and a platform 12. The tanks 4, 6, 8, and 10 are fixed in relation to one another about the platform 12. Platform 12 is generally fixed in a horizontal place with the tanks sloping downwardly at a forty-five (45°) degree angle. Each tank is connected to a piston drive means. Tank 4 is connected to piston 14. Tank 6 is connected to piston 16. Tank 8 is connected to piston 18. Tank 10 is connected to piston 20. The tanks are sealed to withstand the working pressures within the system.

Each tank, as shown in FIG. 1, includes a liquid or fluid that is highly responsive to temperature variation over a practical temperature range, in respect to the energy source. When the sun is used as the energy source and the fluid placed in the tank, for example, an increase in heat will provide an increase in vapor pressure in the tank. The vapor pressure forces the fluid against the piston, pushing the piston in the one direction, a first direction. Black paint may be used on the exposed surface of the tank to aid radiant energy absorption. When the suns rays reach only a small portion of the tanks surface, there will be a decrease in the temperature of the fluid and vapor pressure in the tank. As the vapor pressure decreases the fluid will flow toward the tank to move the piston in the opposite direction, a second direction.

A plurality of internal vanes, not shown, may be connected to the upper surface of the tank. The internal vanes will project below the surface of the fluid in the tank to provide a means to conduct heat throughout the tank. Other vanes, not shown, may be connected to the bottom of the tank to speed the flow of heat away from the tank.

The piston drive shafts are connected to platform 12, as shown in FIG. 1, in a manner to provide a mechanism for orienting the platform 12 in relation to the energy source. Pistons 14 and 18 are connected to the cross shaped member 22. Pistons 16 and 20 are supported on opposite distal ends of the cross member 22. The shafts of pistons 16 and 20 are connected to the central portion 24 of platform 12. Therefore variations in vapor pressure in each tank will be reflected in the movement of platform 12.

As the earth rotates the suns rays will contact various areas of the surface of each tank. The vapor pressure in the tanks will vary, actuating the drive means to adjust the position of the platform 12. Each of the four pistons 14, 16, 18 and 20 will adjust to the position of the platform in relation to the sun above the device. The platform will follow the sun keeping the platform generally perpendicular to the line of sight between the platform and the sun. For example, if the sun moves from a position where at least a portion of the suns rays engage the surface of all four tanks to a position where no rays contact tanks 8 and 10 and more rays contact tanks 4 and 6 with an equal amount of radiant energy; pistons 14 and 16 will drive the piston shafts upward and pistons 18 and 20 will retract the piston shafts to tilt the platform in the direction of the suns rays to expose the entire surface of the platform to the suns direct rays.

Figure 2:
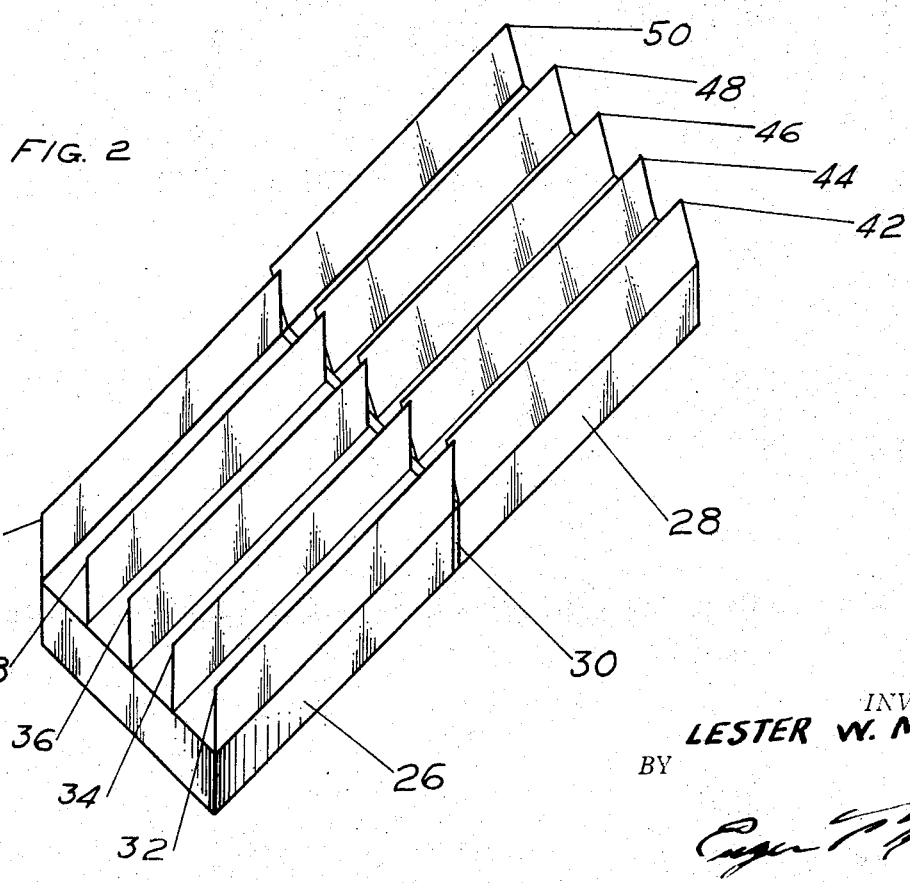
FIG. 2, is a perspective view of two tanks having varying shielding means.

Referring now to FIG. 2, showing two tanks 26 and 28 separated by a nonconductive material 30. Tank 28 utilizes a plurality of vanes 32, 34, 36, 38 and 40 connected to the upper surface of the tanks 26. Vanes 32 to 40 are connected to an upright position at a 90° angle to the upper surface of tank 26. Tank 28 includes a plurality of vanes 42, 44, 46, 48 and 50 connected to the upper surface of tank 28. Vanes 42 to 50 are connected to the upper surface of tank 28 at an angle less than 90°, shown at a 45° angle. The vane construction shown in FIG. 2, illustrates that the vanes may be connected to tanks in order to operate the heat energy transfer device with the tanks fixed in a horizontal arrangement. The vanes provide means for shading the upper surface of the tanks from the sun, except when the sun is in a particular orientation in relation to the tanks. Therefore a plurality of tanks with fins at various angles may be combined to perform an energy orienting function. A non-conductive material may be placed between the vanes and the tanks to insulate the tanks from the heat in the vanes.

Figure 3:
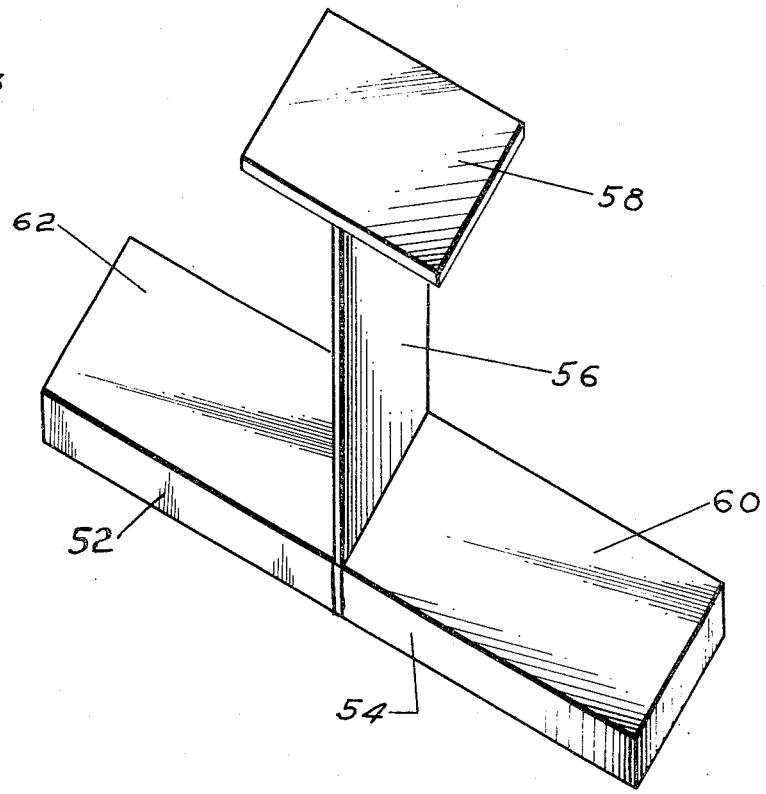
FIG. 3 is a perspective view of another embodiment of the shielding means connected to heat energy transfer tanks.

FIG. 3 shows another vane configuration. Tanks 52 and 54 have a T-shaped vane member connected to the upper surface of insulating material placed between the tanks. The upright portion 56 is connected between the horizontal platform 58 and the upper surface of the tanks. The horizontal platform 58 is connected to the distal end of the upright portion 56. The upright portion shades the tanks in the normal manner as set forth above. The horizontal member 58 will shade a portion, 50 percent of the upper surface 60 and of the upper surface 62 of the tanks when the upright portion 56 points directly toward the energy source. The horizontal member 58 will provide a more sensitive heat transfer device. The movement of the energy source will be sensed by the change of temperature in the tanks from a mean temperature between the high temperature, when the entire surface is exposed to the rays, and the low temperature when the entire surface is shaded from the rays. The change in temperature is relative to the change in surface area exposed to the radiant energy. As the energy source moves the amount of surface area exposed to the radiant energy will change and the temperature in each portion of the tank will change. The temperature change may be registered in drive means in order to guide the movement of the tanks and the T-shape vane.

A mirror, not shown, may be connected between each distal edge of the horizontal platform and the upright portion 56. The mirrored surface is used to reflect the suns rays onto the surface of a tank for initial alignment purposes if the suns rays are parallel to the surface of the tank. The mirror will allow the device to initially orient itself at sunrise when the suns rays are reflected by the mirror to the surface of a tank.

To determine the height of the upright portion 56 and the length of the platform 58 projects outwardly from the upright portion 56, trigonometry is employed. The size relation for a given location may be determined by one skilled in ordinary mathematics.

Figure 4:
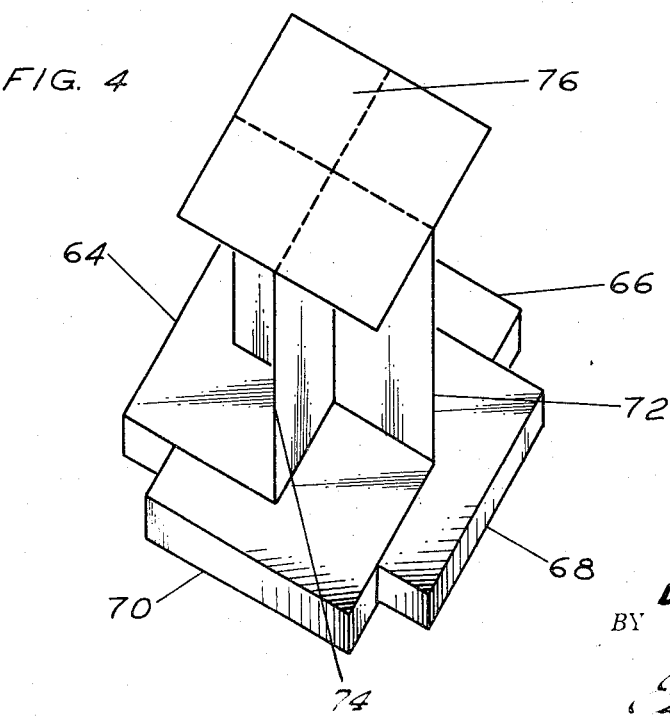
FIG. 4 is a perspective view of another embodiment of the heat energy transfer device having an energy orienting guidance function.

An arrangement of tanks and vanes are shown in FIG. 4. Four L-shaped tanks 64, 66, 68 and 70 are bundled together under four vertical vanes, two of which are shown at 72 and 74. A common horizontal platform 76 is connected to the distal end of the vanes. The tanks are generally fixed in a horizontal plane. The tanks may be connected to a plurality of drive means, not shown, to provide a guidance function.

As the earth rotates the sun's rays will contact various areas of the surface of each tank. The vapor pressure in the tanks will vary, actuating the piston drive means to adjust the position of the bundle of tanks. The pistons will adjust the position of the tanks in relation to the sun stationed above the device. The tanks will follow the sun keeping the tanks in a plane generally perpendicular to the line of sight between the tanks and the sun. The vertical vanes converge along a portion of the line of sight. If the sun is positioned so that no rays contact tanks 68 and 70, and the suns rays contact tanks 64 and 66 providing an equal temperature in each tank, the pistons connected to the tanks 64 and 66 will drive tanks 68 and 70 upward and pistons connected to tanks 68 and 70 will lower tanks 64 and 66 in order to expose equal portions of surface area of all the tanks to the suns rays.

A single tank may be connected to various well-known engines or motors. As the tank is heated the fluid is moved by the vapor pressure. The moving fluid is connected to the engine to drive the vane, piston etc. in one direction. Once the fluid has acted on the vane or piston it may be expelled from the system. The closed tank would have to be opened to refill the tank with fluid after the tank is cooled. Two tanks may be used to provide a closed fluid system to drive an engine. The fluid will pass from one tank into the engine drive to rotate a drive shaft. The fluid thereafter flows out the engine into the second tank. The tanks include a valve system. The valve will be open to atmospheric pressure when the tank receives the fluid. After the second tank receives the fluid the valve is closed and the tank is exposed to the suns rays to continue the second half of the cycle. At the same time the valve in the first tank is opened and the tank is removed from the suns rays. The engines or motors may produce rotary motion in any well known manner.

The instant invention has been shown and described herein in what is considered to be the most practical and preferred embodiment. It is recognized, however, that departures may be made therefrom within the scope of the invention. Therefore, the instant invention is not to be limited to the details discussed herein but to be accorded the full scope of the claims so as to embrace any and all equivalent apparatus and articles.

What is claimed is:

1. A heat energy device for converting energy supplied by a radiant energy source comprising, a tank including radiant energy exposure absorbing surface, a liquid in the tank that partially fills said tank, a gas in the tank that fills the portion of the tank unfilled by said liquid, drive means connected to said liquid in said tank, said drive means being driven by said liquid moved in response to a variation in pressure in said gas do to a variation in the radiation energy being transferred to and from said tank, and means for shielding said radiant energy exposure absorbing surface to provide a variation in the gas pressure in said tank when there is relative angular movement between the radiant energy source and the tanks.

2. A heat energy device for converting energy supplied by a radiant energy source as set forth in Claim 1, wherein,
said tank is generally flat, and
the angular position of said radiant energy absorbing surface in relation to the radiant energy source provides the means for shielding.

3. A heat energy device for converting energy supplied by a radiant energy source as set forth in claim 1 wherein,
a plurality of said tanks fixed in relation to one another, and
a plurality of drive means each of which is connected to a single tank.

4. A heat energy device for converting energy supplied by a radiant energy source as set forth in claim 3 wherein,
said drive means are connected to a platform to orient the platform in relation to the moving radiant energy source.

5. A heat energy transfer device for converting energy supplied by a radiant energy source as set forth in claim 2 wherein,
said shielding means include at least one upwardly projecting member to shield at least one surface of the tanks from the energy source.

6. A heat energy transfer device as set forth in claim 5 wherein,
said shielding means includes a platform projecting outwardly from said upward projecting member to shield a portion of the surface of said tanks from the energy source.

7. A heat energy transfer device as set forth in claim 6 wherein,
each said tank is generally L-shaped.

8. A heat energy transfer device as set forth in claim 7 wherein,
said shielding means are generally T-shaped and include a reflective member connected to the lower surface of the cross member.

* * * * *